O. R. SCHWANTES.
SHOCK ABSORBER.
APPLICATION FILED SEPT. 5, 1917.

1,286,427.

Patented Dec. 3, 1918.
2 SHEETS—SHEET 1.

WITNESSES

INVENTOR
Otto R. Schwantes

By
ATTORNEY

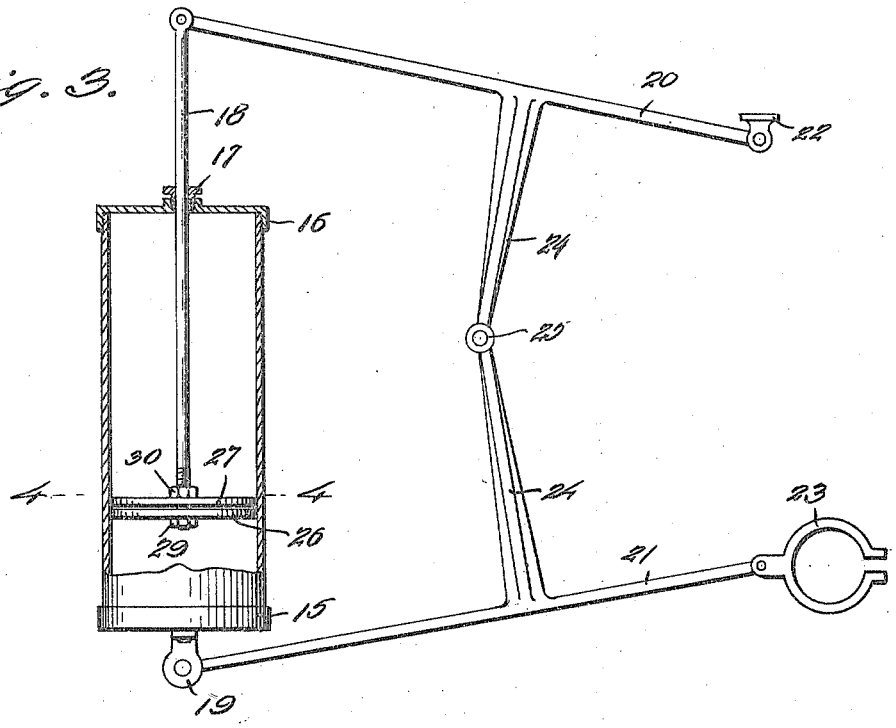

UNITED STATES PATENT OFFICE.

OTTO R. SCHWANTES, OF CLINTONVILLE, WISCONSIN.

SHOCK-ABSORBER.

1,286,427.  Specification of Letters Patent.  Patented Dec. 3, 1918.

Application filed September 5, 1917. Serial No. 189,850.

*To all whom it may concern:*

Be it known that I, OTTO R. SCHWANTES, a citizen of the United States, residing at Clintonville, in the county of Waupaca and State of Wisconsin, have invented certain new and useful Improvements in Shock-Absorbers, of which the following is a specification.

This invention has relation to shock absorbers, for motor vehicles and has for an object to provide a device of this character adapted to cushion the shocks by preventing the quick return of the wagon body to normal position after a sudden depression of the same when the vehicle travels over inequalities in the roadbed.

Another object of the invention is to provide a shock absorber of the character above described embodying a new and novel construction of levers whereby the action of the shock absorber is variable and operates in proportion to the depth of depression of the vehicle body, or in other words in proportion to the shock sustained.

Another object of the invention is to provide a shock absorber for the purpose above described embodying a cylinder, a piston movable therein, said piston being constructed in a novel manner whereby to permit resistance of its movement in one direction and its free movement in an opposite direction.

A still further object of the invention is to provide a shock absorber having its parts arranged in such a manner to permit the use of the shock absorbers beneath vehicles where the available space is limited.

In addition to the foregoing my invention comprehends improvements in the details of construction and arrangement of the parts to be hereinafter more fully described, and particularly set forth in the appended claims.

In the accompanying drawings in which similar and corresponding parts are designated by the same characters of reference throughout the several views in which they appear:

Fig. 3, is a view in elevation partly in section on an enlarged scale illustrating one shock absorber constructed in accordance with my invention.

Fig. 4, is a transverse section in detail taken on the line 4—4 of Fig. 3.

Figure 1:
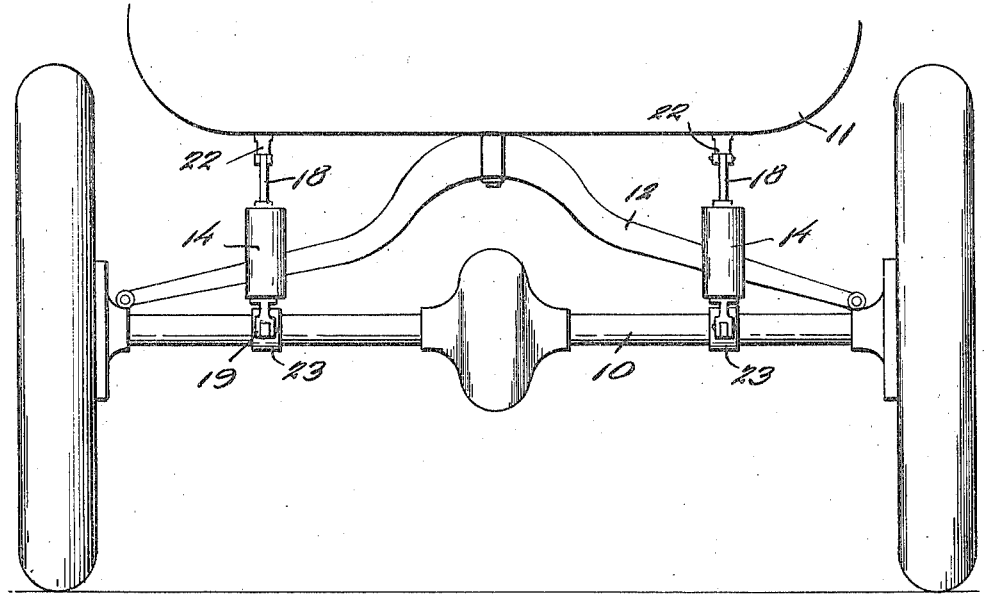
Figure 1, is a view in rear elevation of the rear axle of a motor vehicle illustrating the embodiment therein of my invention.
Figure 2:
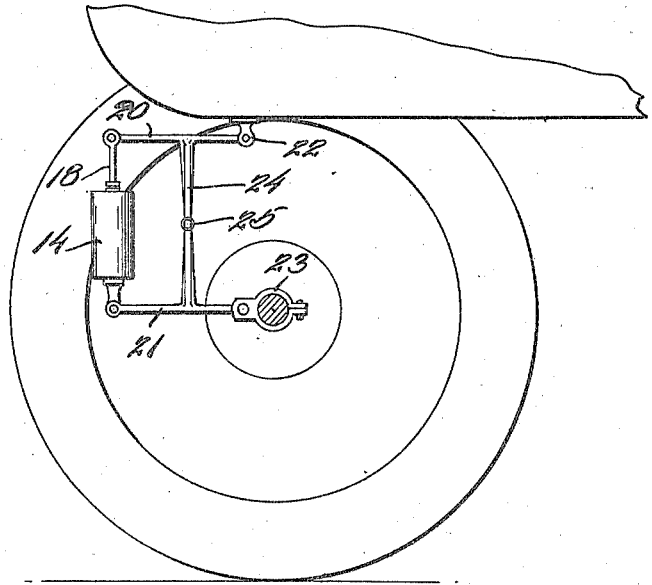
Fig. 2, is a vertical longitudinal section taken through the rear axle of the vehicle.

With reference to the drawings, 10 indicates the rear axle of a vehicle, 11 the body, and 12 the springs supporting the same upon the axle in the usual manner.

A pair of shock absorbers is preferably utilized for each axle, one being located adjacent each end and since the shock absorbers are duplicates in construction a description of one will suffice for all.

Each shock absorber comprises a cylinder 14 which in use is preferably disposed in a vertical position, closed at its lower end by means of a cap 15 and at its upper end by means of a removable cap 16 provided with a packing gland 17. A piston rod 18 is slidably held within the packing gland for reciprocation and the cap 15 is provided exteriorly with a pair of apertured ears 19. A pair of levers 20 and 21 are provided, disposed in substantially horizontal position in superposed relation, the lever 20 being pivotally connected at one end to the outer end of the piston rod 18, and at its opposite end to a clip 22 which is secured to the under side of the vehicle body. The lever 21 is pivotally connected at one end between the ears 19 of the cylinder and at its opposite end to a clip 23 which encircles the axle which may be of any desired construction. Each lever, 20 and 21 is provided at a point substantially intermediate its ends with an arm 24, the same being extended at substantially right angles to the levers and pivotally connected together as at 25. The arms 24 are also preferably of the same length.

The piston rod 18 within the cylinder is provided with a piston which comprises a pair of plates 26 and 27 each formed with oppositely directed segmental wings 28. The plates are apertured centrally to permit the passage therethrough of the piston rod, and the rod is threaded whereby a nut 29 may be applied to the inner extremity thereof. A nut 30 is applied to the threaded end of the bolt in spaced relation to the nut 29 in such a manner as to permit movement of the plate 27 when the piston rod is reciprocated. The plate 27 should be held rigidly against movement and to that end may be secured to the nut 30 if desired.

In operation, the normal position of the parts is such as to dispose the arms 24 of the levers 20 and 21 in mutual alinement which will dispose the piston at the lower end of the cylinder.

When the vehicle body is suddenly depressed during travel of the vehicle over a depression in the road bed, the ends of the levers 20 and 21 connected to the vehicle body and axle respectively are moved toward each other so as to break the joint 25 and dispose the levers in the relative position shown in Fig. 3. Owing to such movement of the levers the piston is moved toward the upper end of the cylinder. During such movement of the piston, the plates 26 and 27 will be separated due to the resistance of the oil and the oil passing between both plates permits free movement of the piston. However, upon a return movement of the vehicle body to normal position and the consequent movement of the piston to a position adjacent the lower end of the cylinder, the plates will be moved toward each other in contact whereby the spaces between the segmental blades 28 will be closed and a substantially solid piston will be the result. The rate of descent of the piston will therefore be slow compared to the rate of its upward movement, and the return movement of the vehicle body will be consequently retarded.

While I have illustrated and described my invention with some degree of particularity, I realize that in practice various alterations thereover may be made, and I therefore desire to reserve the right and privilege of changing the form of the details of construction, or otherwise altering the arrangement of the correlative parts without departing from the spirit of the invention or the scope of the appended claims.

Having thus described my invention what I claim as new and desire to secure by Letters Patent is:—

1. A shock absorber for motor vehicles including a cylinder, a piston movable in the cylinder, a lever pivotally connected to the cylinder, a second lever pivotally connected to a piston for movement therewith, and means pivotally connecting the levers.

2. A shock absorber for motor vehicles, including a cylinder a piston movable in the cylinder, a lever pivotally connected to the cylinder, a second lever pivotally connected to the piston for movement therewith, and arms rigidly connected to each lever and pivotally connected together.

3. A shock absorber for motor vehicles, including a fluid containing cylinder, a piston movable in the cylinder, means on said piston permitting free movement of the piston in one direction and retarded movement in an opposite direction, a lever pivotally connected to the cylinder, a second lever connected to the piston for movement therewith, and an arm on each lever rigidly secured thereto and pivotally connected together.

4. A shock absorber for motor vehicles, including a cylinder, a piston movable in the cylinder including a pair of plates formed with oppositely extending segmental extensions, said extensions being arranged to overlap the spaces between the extensions, a piston rod supporting the plates, means to permit slight movement of the plates toward and away from each other whereby movement of the piston in one direction is retarded, and a pair of levers pivotally connected together and to the cylinder and piston.

5. In combination with a motor vehicle including the axle and body, a pair of contiguously disposed spaced levers, lateral extensions on said levers directed toward each other and pivotally connected, means for connecting one end of one lever to the axle, means for connecting the adjacent end of the other lever to the body, a piston and a cylinder, and means for connecting the piston to the opposite end of one lever and the cylinder to the adjacent end of the other lever.

6. A shock absorber for motor vehicles including a pair of contiguously disposed spaced levers, lateral extensions on the intermediate portions directed toward each other, means for pivotally connecting together the ends of said extensions, means on one end of one lever for connecting the same to the axle of a motor vehicle, means on the adjacent end of the other lever for connecting the same to the body of the vehicle, a piston, a cylinder, means for pivotally connecting the cylinder to the opposite end of one lever, and means for connecting the adjacent end of the other lever to the piston.

In testimony whereof I affix my signature in presence of two witnesses.

OTTO R. SCHWANTES.

Witnesses:
  C. E. GIBSON,
  E. E. LARSON.